US006330557B1

(12) United States Patent
Chauhan

(10) Patent No.: US 6,330,557 B1
(45) Date of Patent: Dec. 11, 2001

(54) METHOD AND SYSTEM FOR STORING DATA IN A HASH TABLE THAT ELIMINATES THE NECESSITY OF KEY STORAGE

(75) Inventor: Abhishek Chauhan, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/107,534

(22) Filed: Jun. 30, 1998

(51) Int. Cl.$^7$ .................................................... G06F 17/30
(52) U.S. Cl. ................................ 707/3; 707/101; 711/216
(58) Field of Search ........................ 707/3, 101; 711/216

(56) References Cited

U.S. PATENT DOCUMENTS

| | | | |
|---|---|---|---|
| 5,390,359 | * | 2/1995 | Damerau .................................. 707/3 |
| 5,809,494 | * | 9/1998 | Nguyen ................................... 707/1 |
| 5,897,637 | * | 4/1999 | Guha .................................... 707/101 |
| 5,914,938 | * | 6/1999 | Brady et al. ......................... 370/254 |
| 5,974,421 | * | 10/1999 | Krishnaswamy et al. ........... 707/103 |

* cited by examiner

*Primary Examiner*—Maria N. Von Buhr
(74) *Attorney, Agent, or Firm*—John R. Carpenter, Esq.

(57) ABSTRACT

A method and system for storing data in a hash table of a computer system. A hash function specifies a storage location of the hash table for data associated with a given key. But instead of storing the key in this location, a smaller value, denoted a specification value is used. Specification values are produced via a specification function that mathematically captures the information lost by the hashing function when the key is mapped to the hash address. As a result, no two keys can have equal specification values and equal hash values. When examining the data stored at any given hash address, the invention recreates the key's specification value and compares it with the stored specification value. When the compared values are equal, the object is identified. Thus, the invention conclusively establishes whether the data is associated with a given key without storing the key in the hash table.

22 Claims, 4 Drawing Sheets

METHOD AND SYSTEM FOR STORING DATA IN A HASH TABLE THAT ELIMINATES THE NECESSITY OF KEY STORAGE

BACKGROUND OF THE INVENTION

1. Field of the Invention

The present invention relates generally to computer systems, and more specifically to the storage of data using a hash table.

2. Related Art

Since the creation of computer systems, engineers have struggled to maintain an optimal balance between efficient storage and fast location of data: Storage needs to be efficient because memory is finite and costly; Data needs to be quickly located to optimize system performance.

A traditional method for storing and accessing data employs a hash table, which is a type of database. A computer system employing such a methodology is shown in FIG. 1. The illustrated system 100 includes the standard array of components: a central processing unit 102; a user interface 104, which typically consists of a keyboard, a mouse, and a monitor; a primary memory 106, such as a random access memory, for program execution; and a secondary memory 108, such as a disk, for storing programs and data that are not immediately needed for execution. Contained within these memories 106, 108 are: an operating system 110 that manages the computer's resources; a database 112 that contains a variety of data objects 114, each containing a key 116 and associated data 118; and a traditional hash program 120.

The workings of the traditional hash program 120 are well-known to those skilled in the art, but will be explained here for the lay reader. Basically, the program 120 uses keys 116 to locate and store objects 114 in the database 112: each key 116 is unique and therefore can be used to identify the key's associated data 118. Typically, keys 116 are potentially large semi-random numbers drawn from a set of such numbers.

For example, consider a business that desires to track its clients' accounts. A database 112 would be created to hold the tracked data 118. In this case, possible keys 116 include the customers' credit card or social security numbers; the associated data 118 could be billing information, such as available credit and billing addresses.

No business would have an account for every social security number or a VISA account holder, and consequently it is unnecessary and wasteful to size a database large to house data for all such individuals. To more efficiently utilize memory, the near infinite set of social security or VISA card numbers is mapped to a smaller, more manageable set. This is done using a hash function, which is contained in the hash program 120. For example, a hash function might map 100 billion possible credit card numbers to a set of 150,000 possible numbers, using mathematical operations to translate the key to a smaller number. The resulting number is called a "hash address" or a "hash value" and identifies an entry of the database 112 for the key 118. In FIG. 1, the dotted boxes 122 represent the hash address at which each respective data object 114 is stored in the database 112.

Since the hash function greatly reduces the amount of information from the key 116 when translating it to the hash address 122, the function may translate two keys to the same address. This occurrence is called a "collision" and must be resolved by the hash program 120. That is, the program must have a method for storing two objects whose keys hash to the same address. One such method is known as "bucket chaining." "Bucket" refers to the database entry for a given hash address; "chain" refers to a linked list of data objects that hash to the same address. In FIG. 1, a "bucket chain" 124 is shown linking two such data objects 114, data object i and data object j. Other types of collision resolution are possible and are well-known those skilled in the art. Thus, they need not be described here.

When resolving collisions, by bucket chaining or similar methods, the traditional hash program 120 stores each object's key 116 along with the associated data 118 in the data object 114. When the program 120 later attempts to access a given object 114, it will again run that object's key 116 through the hash function to produce the key's hash address 120. The program then compares the key used to produce the hash address 122 with the key 116 stored in the data object 114 at the hash address. If these keys are identical, the object has been found. If not, the program 120 continues its search along the chain 124. If no stored key equals the newly produced key, there is no database entry for the key, so a new entry is created.

The traditional hashing methodology provides a reliable means for storing and locating data. But because memory costs are considerable, improvements to the scheme can represent significant cost savings. This is so because reducing the amount of memory needed to store a given set of objects frees memory for other resources. And when each object conserves memory, the overall cost of the computer system is reduced because less memory is required to achieve storage goals. Any reduction in the amount of memory needed to store and access data is therefore valuable.

INVENTION SUMMARY

Embodiments of the present invention provide methods and systems that allow for more efficient storing of data than was before possible. A hash function is utilized to map keys to addresses of a database. These addresses are then used to identify entries of the database in which data associated with the keys is stored. A second function is used to create a specification value for the key. This value, when compared with the hash address, uniquely defines the key for which the associated data belongs. That is, where $s_i$, $s_j$ and $h_i$, $h_j$, represent respective specification and hash values for keys, $k_i$, and $k_j$, $k_i$ must equal $k_j$ whenever the two keys' hash and specification values are equal. Alternatively,

IF $$(s_i=s_j) \& (h_i=h_j)$$

THEN $$(k_i=k_j)$$

By designing a specification function that adheres to the above constraint, the invention significantly reduces the amount of memory needed for storage when the key's specification value is smaller than the key itself. This is because the embodiments of the invention store the specification values in the database instead of the keys. The embodiments conclusively identify the data associated with any key by examining the specification values stored at the key's hash address. More specifically, the embodiments rerun the key through the specification function and compare the resulting specification value with the specification values of objects that are hashed to the key's hash address. If the two specification values are the same, the object has been found because no two keys can have identical hash and specification values.

In one embodiment, the invention stores data using 25 percent less of memory than that needed by traditional systems. This embodiment uses IP addresses as keys to reference four bytes of associated data and uses the hash function:

$$H(Key)=Key \bmod CONSTANT,$$

In this embodiment, the Key is an IP address and the CONSTANT is 65537. The function therefore becomes:

$$H(IP)=IP \bmod 65537.$$

The embodiment employs the following specification function, which is designed to satisfy the constraint discussed above:

$$S(IP)=Key \operatorname{div} CONSTANT=IP \operatorname{div} 65537.$$

The embodiment runs the IP addresses through these functions and stores the resulting two-byte specification values—as opposed to the four-byte IP addresses—in the database entries specified by the hash addresses.

To locate stored data for a particular IP address, that address is run through the hash function to discern the respective hash address. The specification value for the IP address is similarly produced by running the IP address through the specification function. The specification value stored at the hash address is retrieved and compared to the produced specification value. If the compared values are the same, the data stored at the hash address is conclusively determined to belong to the key.

BRIEF DRAWING DESCRIPTIONS

The accompanying drawings illustrate embodiments of the invention that will enable those skilled in the art to make and utilize the invention. In fact, these drawings, when considered with the written disclosure, will enable those skilled in the art to modify these embodiments in a manner that does not depart from the spirit and scope of the invention.

DETAILED DESCRIPTION

Embodiments of the invention will now be described with reference to the accompanying drawings. It is understood that the invention is not limited to these embodiments, as the teachings contained herein will enable others to modify these embodiments without departing from the spirit and scope of the invention. Accordingly, the invention encompasses all such modifications that are described by the appended claims and their equivalents.

Figure 1:
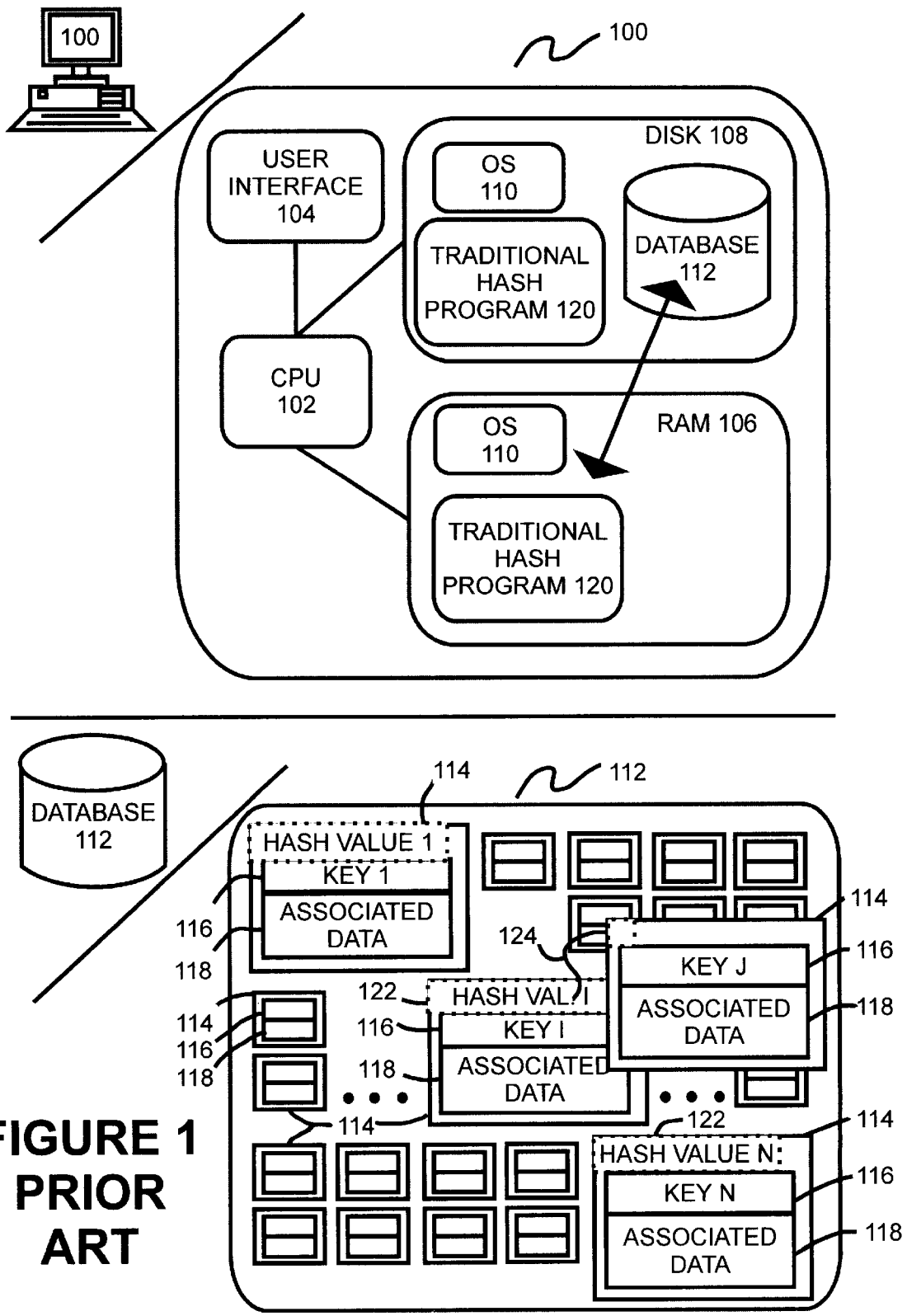
FIG. 1 illustrates a prior art computer system that utilizes a traditional hash table.
Figure 2:
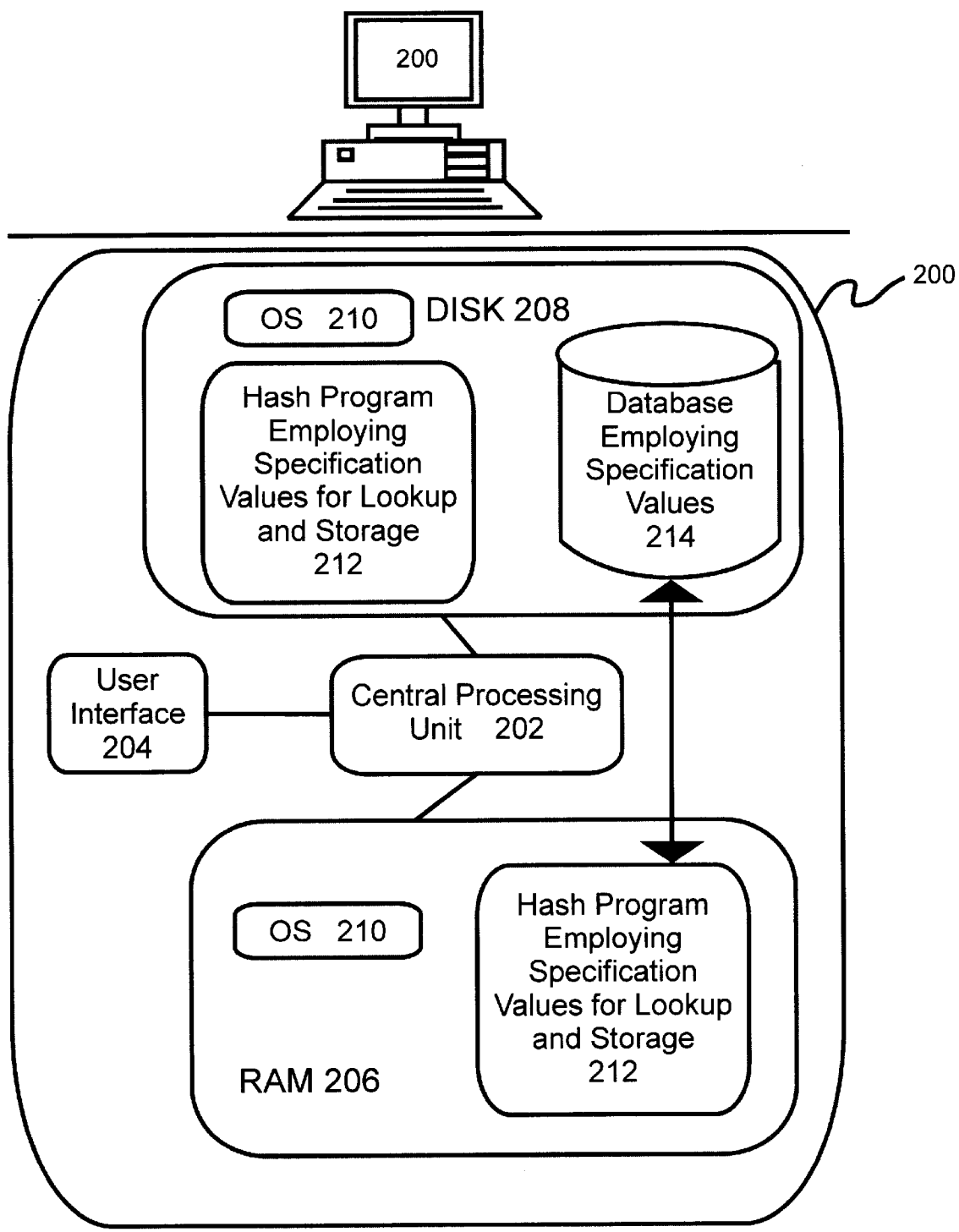
FIG. 2 depicts a computer system that stores and accesses data objects in accordance with an embodiment of the present invention.

A computer system that stores and accesses data objects in accordance with an embodiment of the present invention is illustrated in FIG. 2. The illustrated system 200 includes the same standard components as the traditional system illustrated in FIG. 1, i.e., a central processing unit 202, a user interface 204, a random access memory 206, a disk 208, and an operating system 210. Those skilled in the are will recognize that the present invention is not limited to any particular CPU 212 or processing technology. Nor is the invention limited to any particular operating system 218, as the invention could be utilized in any operating environment, such as WINDOWS 95, WINDOWS 98, UNIX, MacOS, or any JAVA runtime environment. "JAVA runtime environment" refers to the operating environment typified by a JAVA virtual machine and associated JAVA class libraries. JAVA is a registered trademark of SUN MICROSYSTEMS, Inc.

The system displayed in FIG. 2 also contains a hash program 212 that employs specification values for lookup and storage and a database 214 that employs specification values. These latter two entities, working together, provide for very efficient data storage. And while the hash program 212 and the database 214 are shown in RAM and on a hard disk, those skilled in the art will recognize that these objects could be stored and invoked from any media that can store data or have data read from it. Examples of such media include floppy disks, magnetic tapes, phase discs, carrier waves sent across a network, and various forms ROM, such as DVDs and CDs. Thus, the present invention anticipates the use of all computer readable media.

An important step of the inventive process involves the design of a "specification function," which is used to produce the specification values referred to in FIG. 2. In essence, this function preserves the information lost in the hash function's mapping of keys. That is, for any given key, the specification function produces a specification value that will, when evaluated in conjunction with that key's hash value, uniquely identify that key. The specification value—and not the key—is stored in the database 214 and is used to uniquely identify the data associated with the key. This results in memory savings because the specification values are smaller than the keys.

Figure 3:
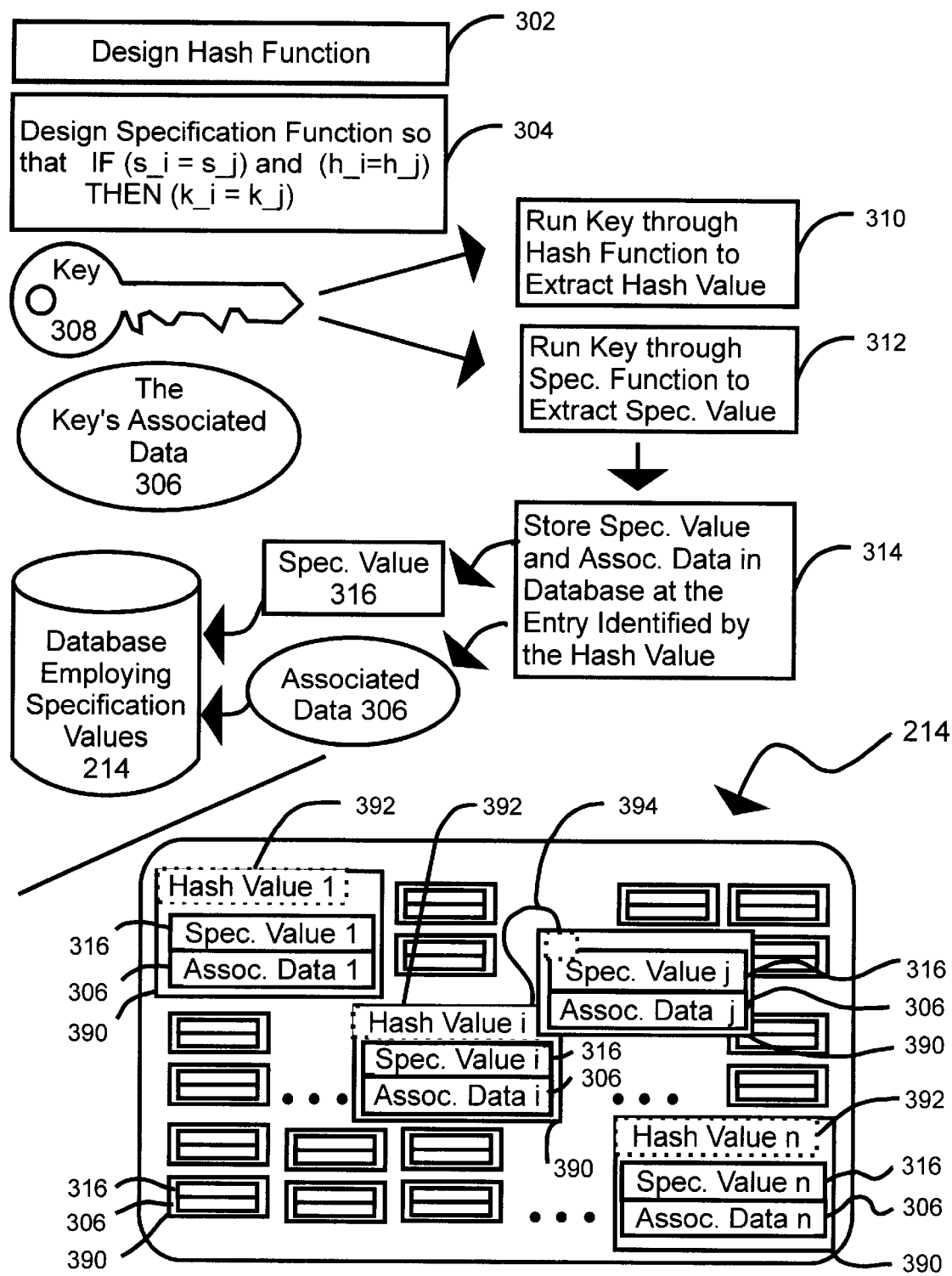
FIG. 3 illustrates processing steps of an embodiment of the present invention and illustrates that embodiment's database.

The fundamental properties of an embodiment of the present invention are set forth in FIG. 3. The first step is to design the hash and specification functions (steps 302, 304). A design goal is that no two distinct keys have identical hash and specification values. Stated positively, if two keys have identical hash and specification values, the two keys are one and the same. For example, consider the case where the set of keys ranges from 1 to n, with i and j being elements of the set. Let $s_i$, $s_j$, and $h_i$, $h_j$ represent respective specification and hash values for keys, $k_i$, and $k_j$. Using this nomenclature, the specification function is designed such that:
IF $$(s_i=s_j) \& (h_i=h_j)$$

THEN $$(k_i=k_j)$$

ENDIF (see step 304)

Once the specification function has been so designed, the data 306 associated with a key 308 can be stored in the database 214. The next step is to run the key 308 through the hash and specification functions producing the key's respective hash and specification values (steps 310, 312). The hash value 392 identifies an address of the database 214 in which the data object 390 will be stored. The specification value 316 is stored along with the key's associated data 306 in the entry identified by the hash value (step 314). These above steps are performed for all keys that have associated data.

In cases where two keys hash to the same value, the collision is resolved using traditional techniques, such as "bucket chaining." Such a chain 394 is illustrated in FIG. 3 for the data objects i and j. Importantly, the key 308 is not stored in the database 214. Instead, the smaller specification value 316 is stored.

Figure 4:
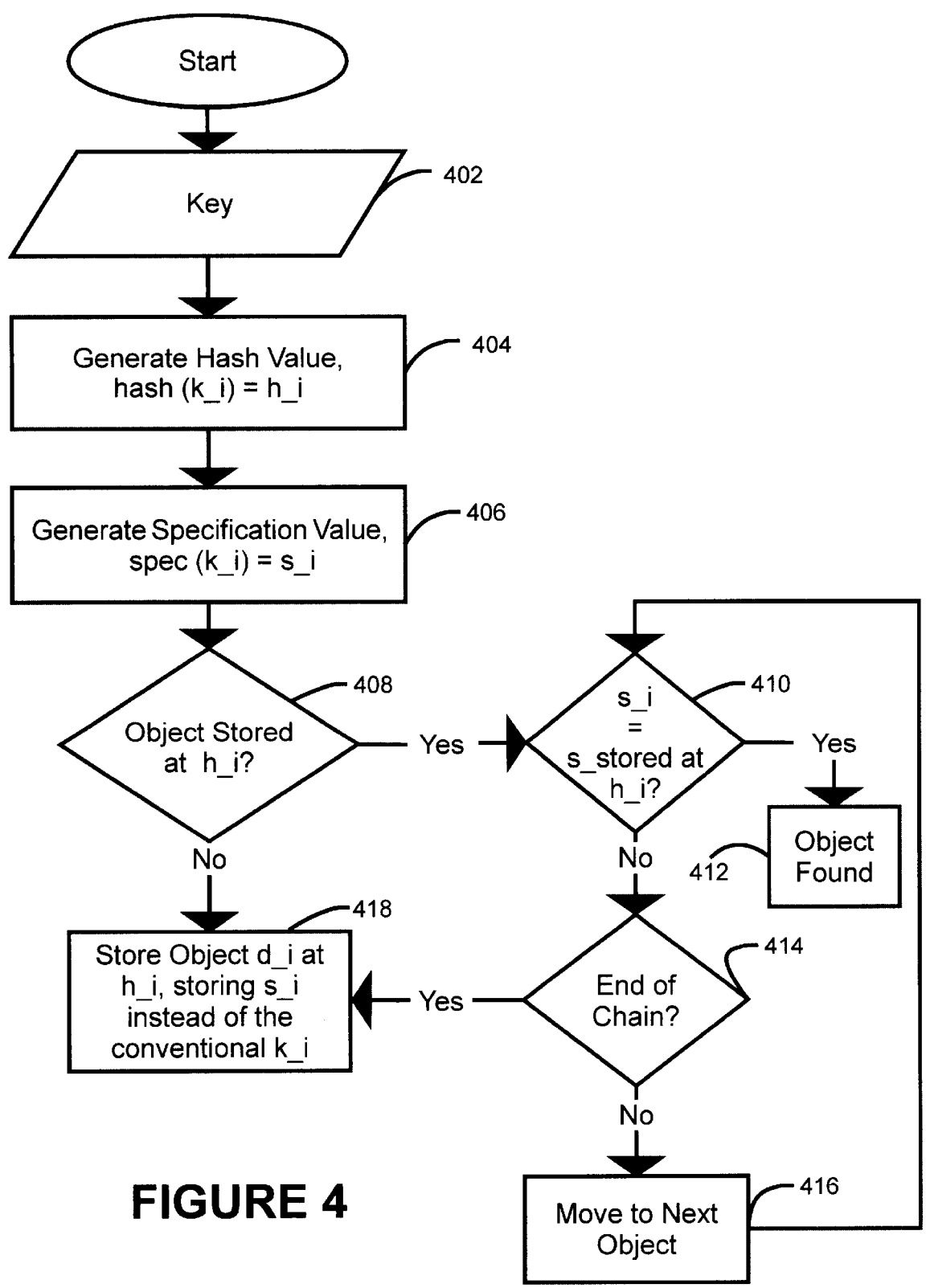
FIG. 4 is a flow chart detailing the processing steps of an embodiment of the present invention.

The lookup and storage procedures for the embodiment will now be explained in detail, referring to FIG. 4. The first step is to retrieve a key for the desired object, i.e., the object to be stored or retrieved (step 402). Next, hash and specification values are generated for the key by running the key through the respective functions (steps 404, 406). The database is then examined to discern whether an object is stored at the entry specified by the hash address (step 408). If there is, the generated specification value is compared to the specification value stored at the hash address (step 410). If the generated and stored values are identical, the object stored at the hash address is necessarily the key's object (step 412). If they differ, there has been a collision and it is necessary to move to the next data object of the bucket chain and repeat the comparison (steps 414, 416, 410). If there is no next item, the key is new to the database. In this case, the key's specification value and associated data are stored in the next available location of the chain (steps 414, 418). Similarly, a new database entry is created when there is no existing object stored at the key's hash address (steps 408, 418).

The embodiment's storage method—because it eliminates the necessity to store the key—can substantially reduce the amount of memory needed to store a given amount of data. This savings will now be illustrated with a specific example, which required the storing of a mapping of host computers to server computers. A brief discussion of Internet communications is included because the example relates to this subject.

Communication over the Internet is made by adhering to what is known as the Internet Protocol, which is well known to those skilled in the art. The lay reader, however, may conceptualize this protocol as a set of rules that defines how information is transferred between computers that are connected to the Internet. Relevant for this example is the protocol's use of numeric addresses, known as IP addresses, that uniquely identify each such computer. An IP address is four bytes in length, for example: 197.145.89.53. Since an IP address is unique, it can be used as a key when storing data associated with the computer identified by the address. Thus, in the embodiment discussed here, the host computers' IP addresses are used as keys. The associated data for each key is the four-byte IP address that identifies the host's server.

The first step is to select a hash function that will map the large set of potential IP addresses to a smaller set that may be maintained in database (step 302). One well-known hash function takes the form:

$$H(\text{Key}) = \text{Key mod CONSTANT}.$$

Through the use of the modulo operator, this function assigns the remainder of "Key divided by CONSTANT" as the hash value. CONSTANT is selected as a prime number to ensure randomness of the resulting hash values.

In one embodiment, CONSTANT is selected as 65537, which is the smallest prime number larger than 216. The value of this selection will be explained below with reference to the specification function. Substituting the IP address as the Key and 65527 as the CONSTANT, the hash function becomes:

$$H(IP) = IP \bmod 65537.$$

The next step is to design a specification function such that a given IP address can be uniquely identified by comparing its hash and specification values (step 304). That is, to guarantee that each IP address stored at a given hash address will contain a unique specification value. Using pseudo-code, the specification function must be designed such that:

IF
{
  (Specification Value of $IP_i$=Specification Value of $IP_j$)
    AND
  (Hash Value of $IP_i$=Hash Value of $IP_j$)
{
THEN
  $IP_i$ must equal $IP_j$
ENDIF By exploiting the fact that any given number will, when divided and modulated by a single constant, produce a unique (dividend, remainder) set, the specification function can be designed as:

$$S(\text{Key}) = \text{Key div } M.$$

Substituting "IP address" as the key and the "65537" as the divisor, the specification function becomes:

$$S(IP) = IP \text{ div } 65537$$

Because the divisor 65537 is at least half as large as any given IP address, the specification value for any IP address can be stored using a maximum of two bytes. Thus, this embodiment of the invention stores a two byte specification value in the database as opposed to the four byte key that would be stored by traditional systems. As a result, the embodiment's data objects 390 store the needed information using only six bytes (two bytes for the specification value 316, four bytes for the data 306)—traditional system require eight bytes (four bytes for the key 116, four bytes for the data 118). This represents a savings of 25 percent. In a case where a million data objects were stored, the savings translates to over 2 megabytes of storage.

Therefore, by designing a specification function that mathematically captures the information lost by the hash function, the present invention can, by examining the specification values for objects whose keys hash to a particular address, conclusively determine the object of any given key—and do so without storing the key in the database. This translates to memory savings because the specification values are smaller than the keys.

The above description will enable those skilled in the art to make numerous modifications to the described embodiments without departing from the spirt and scope of the claimed invention. Indeed, the chosen embodiments were selected so others could best utilize the invention by making such modifications to tailor the invention to their particular needs. The description therefore should not be read as limiting the invention to the embodiments explained herein.

For example, "specification" has been used to described the function and value that allow for improved storage. This descriptive term of course does not singularly define the invention. Rather, it is the properties that this term represents that are important. For these properties, when used in conjunction with the processing steps outlined herein, allow for improvements in computerized storage technologies. Thus, so long as these properties are being used, it makes little difference what the "specification function" or "specification value" is called. The invention therefore is not circumvented by alterations in terminology or other modifications that read on the appended claims and their equivalents.

What is claimed is:

1. A computer-readable medium containing computer instructions that cause a computer system to access data objects stored in a database that is contained in a memory of the computer system, the medium comprising:

instructions that, when executed, run a key through a hash function to obtain a hash address where a data object associated with the key will be stored;

instructions that, when executed, run the key through a specification function to produce a specification value for the key, the specification function being designed such that, when considered together, the specification value and the hash value uniquely identify the key; and instructions that, when executed, store the data object and the specification value in the database at the hash address.

2. The computer-readable medium of claim 1 wherein the medium further comprises:

instructions that are executed after the data object and the specification value are stored, the instructions causing,
a re-running of the key through the hash function to recreate the hash address;
an access to an entry of the database that is identified by the recreated hash address;
a re-running of the key through the specification function to recreate the specification value;
a comparing of the specification value stored at the accessed entry with the recreated specification value; and
a determination that the accessed entry contains the data associated with the key when the stored specification value is equal to the recreated specification value.

3. The computer-readable medium of claim 2 wherein the design of the specification function comprises:

selecting two keys, denominated $k_i$ and $k_j$, from a set of keys;
designing the hash function so that Hash Address $(k_i)=h_i$ and Hash Address$(k_j)=h_j$;
designing the specification function so that Specification Value$(k_i)=s_i$ and Specification Value$(k_j)=s_j$; and
requiring $k_i$ to equal $k_j$ whenever $h_i$ equals $h_j$ and $s_i$ equals $s_j$.

4. The computer-readable medium of claim 2 wherein the hash function is defined as:

Hash Address(Key)=Key mod CONSTANT, and wherein the specification function is defined as:

Specification Value(Key)=Key div CONSTANT.

5. The computer-readable medium of claim 1 wherein the design of the specification function comprises:

selecting two keys from a set of keys;
denominating the selected keys $k_i$ and $k_j$;
designing the hash function so that Hash Address $(k_i)=h_i$ and Hash Address$(k_j)=h_j$;
designing the specification function so that Specification Value$(k_i)=s_i$ and Specification Value$(k_j)=s_j$; and
requiring $k_i$ to equal $k_j$ whenever $h_i$ equals $h_j$ and $s_i$ equals $s_j$.

6. The computer-readable medium of claim 1 wherein the hash function is defined as:

Hash Address(Key)=Key mod CONSTANT, and wherein the specification function is defined as:

Specification Value(Key)=Key div CONSTANT.

7. In a computer system, a method for storing and accessing data objects of a database, the method comprising:

selecting a key from among a set of keys, wherein each key of the set uniquely identifies an associated grouping of data;

running the key through a hash function to determine a hash address for the key, the hash address identifying an entry of a database of the computer system;

storing the grouping of data that is associated with the key in the entry of the database that is identified by the hash address for the key;

running the key through a second function to determine an identifying value for the key that, when evaluated along with the hash address for the key, uniquely identifies the key; and storing the identifying value for the key in the entry of the database that is identified by the hash address for the key.

8. The method of claim 7 wherein two keys from the set of keys are denominated as $k_i$ and $k_j$, the method further comprising:

running $k_i$ and $k_j$ through the first and second functions to produce hash addresses and identifying values for $k_i$ and $k_j$; and designing the second function so that $k_i$ must equal $k_j$ when the identifying value for $k_i$ equals the identifying value for $k_j$ and when the hash value for $k_i$ equals the hash value for $k_j$.

9. The method of claim 8 wherein the hash function is defined as:

Hash Address(Key)=Key mod CONSTANT, and wherein the second function is defined as:

Identifying Value(Key)=Key div CONSTANT.

10. The method of claim 7 further comprising:

reselecting the key from among the set of keys;
rerunning the key through the hash function to again determine the hash address for the key;
retrieving the stored identifying value from the entry of the database that is identified by the hash address;
rerunning the key through the second function to recreate the identifying value for the key;
comparing the stored identifying value with the recreated identifying value; and
recognizing that the entry of the database contains the grouping of data that is associated with the key when the stored identifying value equals the recreated identifying value.

11. The method of claim 10 wherein two keys from the set of keys are denominated as $k_i$ and $k_j$, the method further comprising:

selecting two keys from the set of keys;
denominating the selected keys as $k_i$ and $k_j$;
running $k_i$ and $k_j$ through the first and second functions to produce hash addresses and identifying values for $k_i$ and $k_j$; and designing the second function so that $k_i$ must equal $k_j$ when the identifying value for $k_i$ equals the identifying value for $k_j$ and when the hash value for $k_i$ equals the hash value for $k_j$.

12. The method of claim 10 wherein the hash function is defined as:

Hash Address(Key)=Key mod CONSTANT,
and wherein the second function is defined as:

Identifying Value(Key)=Key div CONSTANT.

13. A computer system, comprising:
   a memory;
   a database stored in the memory and containing a plurality of data objects, each data object having two components, a specification value and a grouping of data;
   a hash program stored in the memory, wherein the hash program utilizes the specification value to locate a desired data object from among the plurality of data objects by running a key through a hash function to discern a hash address to look for the desired data object, the program also running the key through a specifying function to produce the specification value for the key, the program then comparing the produced specification value with the specification value of a data object that is stored at the hash address, and the program conclusively locating the desired data object when the produced specification value equals the stored specification value.

14. The computer system of claim 13 wherein the specification function and the hash function are interrelated in that they adhere to the following constraint for any two keys, denominated $k_i$ and $k_j$:
   IF
      (the specification value for $K_i$ equals the specification value for $k_j$)
      AND
      (the hash address for $k_i$ equals the hash address for $k_j$)
   THEN
      ($k_i$ must equal $k_j$)
   ENDIF.

15. The computer system of claim 13 wherein the hash function is defined as: H(Key)=Key mod CONSTANT and wherein the specification function is defined as: S(Key)=Key div CONSTANT.

16. The computer system of claim 15 wherein the key used in the hash function is an Internet addresses and the CONSTANT is the number 65337.

17. A computerized system for storing and accessing data objects, the system comprising:
   means for running a key through a hash function to determine a hash address for the key, the hash address identifying an entry of a database of the system;
   means for storing the grouping of data that is associated with the key in the entry of the database that is identified by the hash address for the key;
   means for running the key through a second function to determine an identifying value for the key that, when evaluated along with the hash address for the key, uniquely identifies the key; and
   means storing the identifying value for the key in the entry of the database that is identified by the hash address for the key.

18. The system of claim 17 wherein $k_i$ and $k_j$ denominate two keys from a set of keys, the system further comprising:
   means for running $K_i$ and $k_j$ through the first and second functions to produce hash addresses and identifying values for $k_i$ and $k_j$; and
   means for recognizing that $k_i$ must equal $k_j$ when the identifying value for $k_j$ equals the identifying value for $k_j$ and when the hash value for $k_i$ equals the hash value for $k_j$.

19. The system of claim 18 wherein the hash function is defined as:

Hash Address(Key)=Key mod CONSTANT,
and wherein the second function is defined as:

Identifying Value(Key)=Key div CONSTANT.

20. The system of claim 17, further comprising:
   means for rerunning the key through the hash function to again determine the hash address for the key;
   means for retrieving the stored identifying value from the entry of the database that is identified by the hash address for the key;
   means for rerunning the key through the second function to recreate the identifying value for the key;
   means for comparing the stored identifying value with the recreated identifying value; and
   means for recognizing that the entry of the database contains the grouping of data that is associated with the key when the stored identifying value equals the recreated identifying value.

21. The system of claim 17 wherein the hash function is defined as:

Hash Address(Key)=Key mod CONSTANT,
and wherein the second function is defined as:

Identifying Value(Key)=Key div CONSTANT.

22. The system of claim 17 wherein $k_i$ and $k_j$ denominate two keys from a set of keys and wherein the second function is designed such that $k_i$ must equal $k_j$ when the identifying value for $k_i$ equals the identifying value for $k_j$ and when the hash value for $k_i$ equals the hash value for $k_j$.

* * * * *